April 29, 1924.

J. F. LOGAN ET AL 1,491,958

FOOD COOKER

Filed April 18, 1922   3 Sheets-Sheet 1

INVENTORS.
J.F.LOGAN
W.A.LOGAN
By Fetherstonhaugh & Co.
ATTYS.

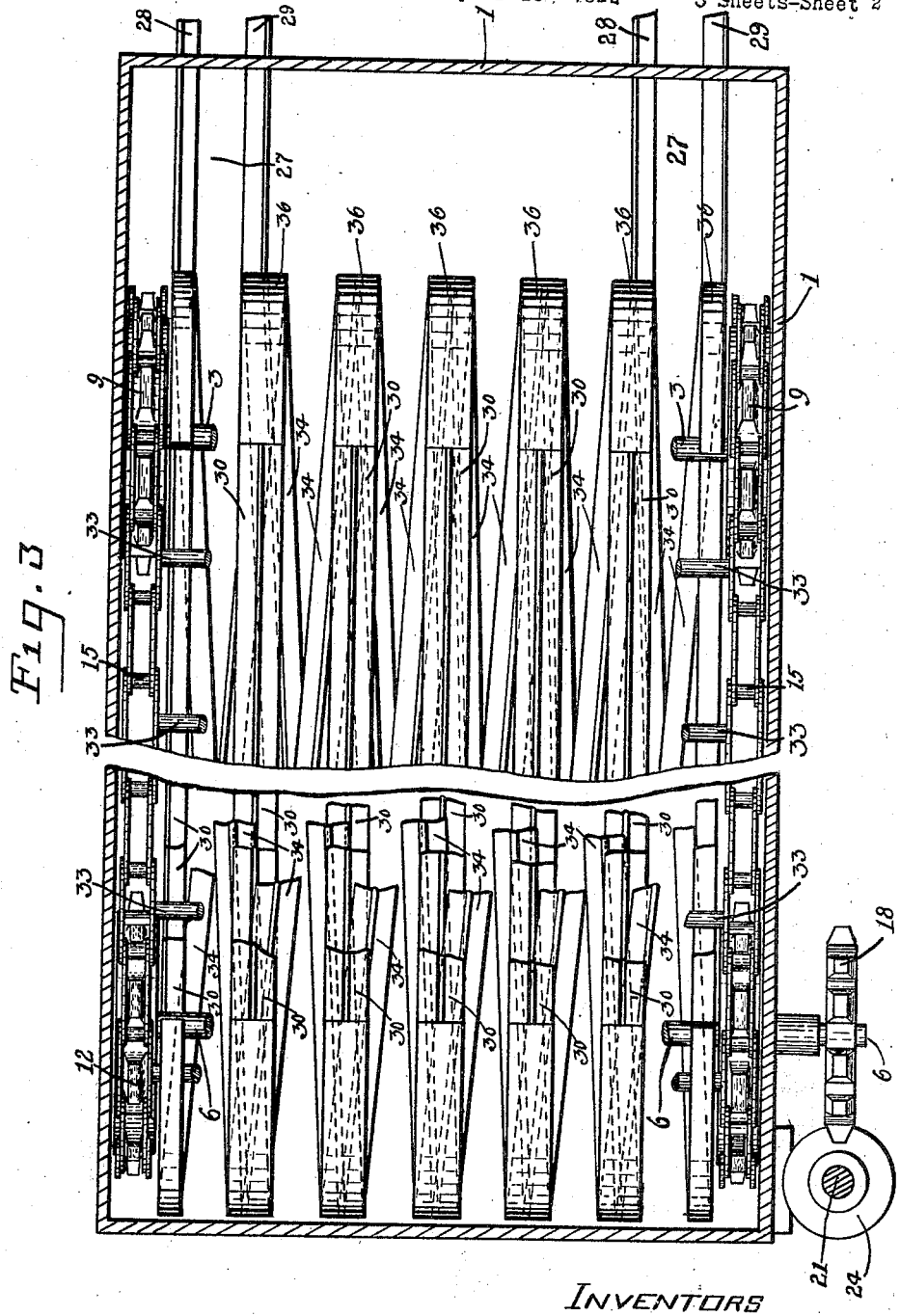

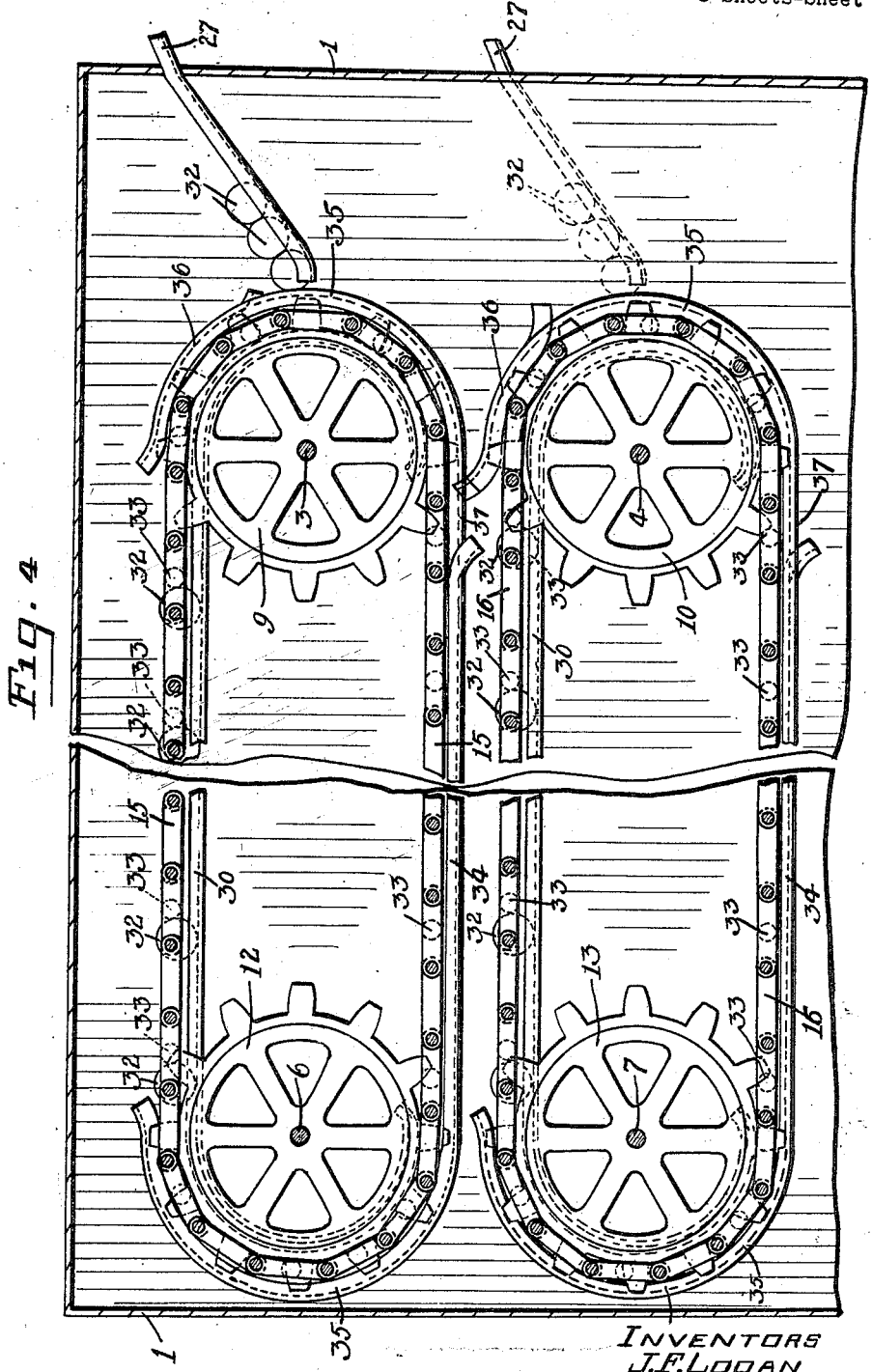

Patented Apr. 29, 1924.

1,491,958

UNITED STATES PATENT OFFICE.

JOHN FRANKLIN LOGAN, OF ST. CATHARINES, ONTARIO, CANADA, AND WINFIELD ALLISON LOGAN, OF BUFFALO, NEW YORK.

FOOD COOKER.

Application filed April 18, 1922. Serial No. 555,435.

*To all whom it may concern:*

Be it known that we, JOHN FRANKLIN LOGAN, a resident of the city of St. Catharines, in the county of Lincoln, in the Province of Ontario, Canada, and WINFIELD ALLISON LOGAN, a resident of the city of Buffalo, in the county of Erie, in the State of New York, United States, and both subjects of the King of Great Britain, have invented certain new and useful Improvements in Food Cookers, of which the following is the specification.

Our invention relates to improvements in food cookers and the object of the invention is to devise a cooker which will cook foods in hermetically sealed containers under the action of dry heat and is particularly designed to carry out our process as described and claimed in United States Patent, Number 1,365,928, issued January 18th, 1921.

Our invention consists of a food cooker constructed and arranged substantially as hereinafter more particularly described and illustrated in the accompanying drawings in which:

Fig. 3 is an enlarged plan view broken away intermediately, showing the disposition of the tracks for guiding the cans during their progress through the machine, and Fig. 4 is an enlarged longitudinal sectional view of the upper two sections of the cooker.

Like characters of reference indicate corresponding parts in the different views.

Figure 1:
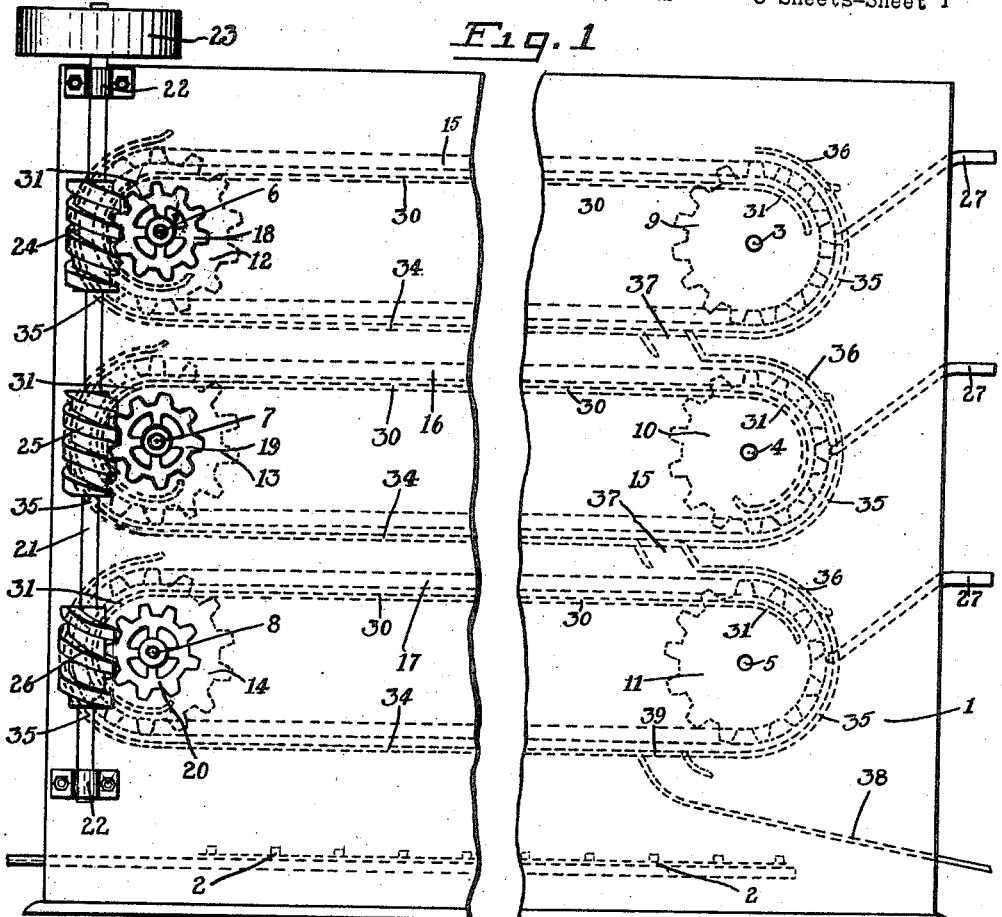
Fig. 1 represents a side elevation of a machine constructed according to our invention showing the same broken away intermediately.
Figure 2:
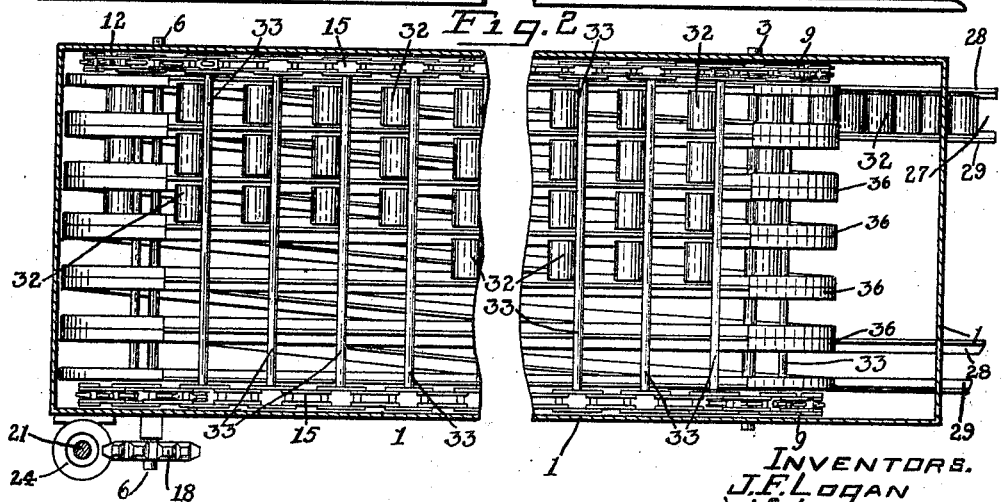
Fig. 2 is a plan view thereof broken away intermediately.

1 is the casing of the machine provided with a source of dry heat such as the gas burners 2. 3, 4 and 5 are cross shafts rotatably mounted in suitable journals in the casing 1 one above the other, said shafts 3, 4 and 5 being suitably disposed in the vicinity of one end of the casing. 6, 7 and 8 are cross shafts rotatably mounted in suitable journals in the vicinity of the other end of the casing, said shafts being mounted one above the other as is clearly shown in Figure 1.

9 are sprocket wheels mounted in the vicinity of each end of the shaft 3. 10 are sprocket wheels mounted in the vicinity of each end of the shaft 4. 11 are sprocket wheels mounted in the vicinity of each end of the shaft 5. 12 are sprocket wheels mounted in the vicinity of each end of the shaft 6. 13 are sprocket wheels mounted in the vicinity of each end of the shaft 7. 14 are sprocket wheels mounted in the vicinity of each end of the shaft 8, said sprocket wheels being mounted on the said shafts inside the casing 1.

15 are sprocket chains connecting each sprocket wheel 3 to the corresponding sprocket wheel 6. 16 are chains connecting each sprocket wheel 4 to the corresponding sprocket wheel 7. 17 are chains connecting each sprocket wheel 5 to the corresponding sprocket wheel 8. 18, 19 and 20 are worm wheels keyed to the shaft 6, 7 and 8 respectively, exteriorly of the casing 1. 21 is a vertical drive shaft suitably mounted in the bearings 22 on the side of the casing 1. 23 is a drive pulley connected with such vertical drive shaft.

24, 25 and 26 are worms slidably keyed to the shaft 21 and adapted to mesh respectively with the worm wheels 18, 19 and 20. 27 is an adjustable trough adapted to admit the cans to the machine as shown in Figure 1, said trough being constructed of the oppositely disposed angle iron members 28 and 29. 30 are longitudinally disposed inverted T angle iron members adapted to extend above the shafts 3 and 6, 4 and 7 and 5 and 8 respectively, said angle iron members 30 being provided with downwardly curved ends 31. The adjacent angle iron members 30 constitute tracks upon which the cans 32 are rolled.

33 are laterally extending rods extending between the pairs of chains 15, 16 and 17 and connected to corresponding links thereof, said rods propelling the cans 32 along the tracks 30. 34 are longitudinally disposed T angle iron members extending below the shafts 3 and 6, 4 and 7, and 5 and 8 respectively and each provided with the upwardly curved guard ends 35 as is illustrated in Figures 1 and 4, opposite outer members of adjacent sections being provided with a downwardly curved end 36 instead of an upwardly curved end as is shown in Figures 1 and 4. 37 are discharge orifices in the opposite outer tracks 34 permitting the can to roll therethrough onto a track 30 of the next lower section it being understood that the adjacent members 34 constitute lower tracks of each section upon which the cans are revolved by the rods.

The tracks 34 are inclined laterally so that the cans 32 after a partial revolution, instead of being again revolved on the same outer track 30 will be passed onto the next track 30 toward the discharge of the section, the upper and lower sections of track members 34 being inclined laterally in one direction whereas the intermediate section of track members 34 is inclined laterally in the opposite direction for the reason that will be apparent hereafter.

38 is a discharge trough communicating with the discharge orifice 39 in the outer track members 34 of the lower section through which the cans are finally discharged from the machine.

We will now describe the operation of the device.

Upon the shaft 21 being driven in the required direction from the pulley 23, the worms 24, 25 and 26 will through the medium of the worm wheels 18, 19 and 20 drive the shafts 6, 7 and 8 in an anti-clockwise direction, and consequently drive the chains 15 in the same direction. As the rods 33 are connected to the corresponding links of the pairs of chains 15, 16 and 17 these rods will move in unison with such chains.

Consequently when the cans are introduced into the machine through the trough 28 each can will be picked up by a rod 33 and rolled along the upper track 30. When it comes to the left hand of the machine it will engage the guard end 35 of the tracks 34 and be driven along such track 34 and as such track is inclined laterally the can will be driven up onto the next track 30 and consequently back and forth along the tracks 30 and 34 until it reaches the outer track 34 at the side of the machine remote from its entrance. When it passes along such outer track 34 it will reach the orifice 37 and thus be deposited onto the track 30 of the intermediate section being revolved along it until it is passed onto the track 34 of the intermediate section which being inclined in the opposite direction will drive the can along until it comes onto the next track 30 and consequently it will be revolved about the intermediate section until it reaches the opposite or entrance side of the section, when upon being revolved along the intermediate track 34 it will be deposited through the orifice 37 onto the lower track 30 being revolved about this lower section until it reaches the side of the machine remote from the entrance side when upon being passed along the track 34 it will be deposited through the orifice 39 and out of the machine along the trough 38.

From the above description it will be seen that each can is revolved spirally by means of the tracks from one side of the upper section to the other side which is remote from the entrance, then deposited into the next or intermediate section where it is revolved spirally to the entrance side of the machine, then deposited in the lower section when it is revolved spirally to the discharge side.

As is well known, foods require different lengths of time for cooking. For instance meats or fish frequently vary greatly from fruit or vegetables and consequently by varying the speed of the shaft 21 the time taken for a can to pass through the machine where it is heated by dry heat from the burners 2 can be varied at will to suit the particular product that is being cooked.

Further where it is desired to cook certain products a very short time the adjustable trough 27 can be adjusted so as to introduce the cans initially into the intermediate section instead of the top section and thus reduce the time of cooking by one-third or to introduce the cans to the lower section and merely revolve the cans spirally about the lower section when the food will be cooked for one-third of the time. This variation can of course be attained without variation of the shaft 21, the speed of which can also be varied to suit different requirements.

It is to be understood that when only one or two sections of the machine are being operated the other sections can be rendered inoperative so as to lie idle by disengaging the worm 24 or the worms 24 and 25 from the corresponding worm wheels.

Although we have described our machine as having upper, intermediate and lower sections of tracks it is to be understood that it could be constructed of any number of sections.

From the above description it will be seen that we have devised a simple and effective machine for cooking food by dry heat which is particularly applicable to our process referred to above. In addition the machine will be very compact owing to its particular construction.

What we claim as our invention is:

1. An apparatus for cooking food in hermetically sealed cans by the application of dry heat comprising a heating chamber, a series of superimposed endless conveyers mounted to operate therein, can guiding and supporting means associated with each conveyer and arranged to cause the cans delivered to the conveyer to follow a spiral path traversing the width of the conveyer, the guiding and supporting means of each conveyer being reversely arranged with respect to the corresponding means of the adjacent conveyer to reverse the direction of can movement, means for delivering cans to one of said conveyers, means for transferring the cans from one conveyer to the other, and means cooperating with said conveyers to discharge the heated cans from said chamber.

2. An apparatus according to claim 1 in which the can delivering means is adjustable to effect initial delivery of the can to any one of said conveyers to cause the cans to pass through all or certain of said conveyers.

3. In a cooker for cooking food in hermetically sealed cans by dry heat, a plurality of sections, a casing, a source of dry heat therein for heating the casing, said sections arranged one above the other, means for introducing the can into the upper section, means for driving the can in a spiral direction through the upper section from one side of the same to the other, means for depositing the same onto the intermediate section, means for driving the can from one end of the intermediate section to the other, means for discharging the can onto the lower section at the opposite side of the section to which it enters the same, means for driving the can spirally through the lower section from one side to the other and discharging it from the machine at the opposite side to which it enters the lower section, said can being revolved about its longitudinal axis during its progress through the respective sections.

4. In a cooker for cooking food in hermetically sealed cans by dry heat, a plurality of sections, a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks.

5. In a cooker for cooking food in hermetically sealed cans by dry heat, a plurality of sections, a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks, the lower tracks being inclined laterally for driving the can successively onto each upper track of the section.

6. In a cooker for cooking food in hermetically sealed cans by dry heat, a casing a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks, laterally disposed rods connected to the corresponding links of the chains for driving the can alternately along each of the upper and lower tracks until it travels from one side of the section of the track to the opposite side, said can being rotated on its longitudinal axis during its progress along said tracks.

7. In a cooker for cooking food in hermetically sealed cans by dry heat, a plurality of sections each comprising a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks, the lower tracks being inclined laterally for driving the can successively onto each upper track of the section, means for driving the chains of each section in unison and means for depositing the can after traversing one section into the next lower section.

8. In a cooker for cooking food in hermetically sealed cans by dry heat, a plurality of sections each comprising a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks, the lower tracks being inclined laterally for driving the can successively onto each upper track of the section, means for driving the chains of each section in unison, the opposite outer lower track members of each adjacent section having discharge orifices therein, through which the can is discharged onto the corresponding track member of the next section.

9. In a cooker for cooking food in hermetically sealed cans by dry heat, a plurality of sections each comprising a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks, the lower tracks being inclined laterally for driving the can successively onto each upper track of the section, means for driving the chains of each section in unison, the opposite outer lower track members of each adjacent section having discharge orifices therein, through which the can is discharged onto the corresponding track member of the next section, the lower track members of each adjacent section being inclined laterally in opposite directions.

10. In a cooker for cooking food in hermetically sealed cans by dry heat, a plurality of sections each comprising a casing, a source of dry heat therein for heating the casing, cross shafts extending laterally of the casing in the vicinity of each end thereof, sprocket wheels carried by said cross shafts, chains connecting the corresponding sprocket wheels on each shaft together, means for introducing the can into the machine, a plurality of longitudinally arranged upper and lower tracks and means connected to the chains for driving the can alternately along each of the upper and lower tracks until it travels from one side of the section of the track to the opposite side, said can being rotated on its longitudinal axis during its progress along said tracks, the lower tracks being inclined laterally for driving the can successively onto each upper track of the section, worm wheels situated on the corresponding shafts of each section, a vertical drive shaft and worms slidably keyed to said vertical drive shaft for driving the aforesaid worm wheels.

JOHN FRANKLIN LOGAN.
WINFIELD ALLISON LOGAN.